Oct. 7, 1924. Re. 15,925

F. C. WHIPPEY

LOCKING BOLT AND NUT

Original Filed Nov. 9, 1920

Inventor
Frederick C. Whippey.

By Clement A. Hoag Atty.

Reissued Oct. 7, 1924.

Re. 15,925

UNITED STATES PATENT OFFICE.

FREDERICK C. WHIPPEY, OF CHICAGO, ILLINOIS.

LOCKING BOLT AND NUT.

Original No. 1,387,085, dated August 9, 1921, Serial No. 422,754, filed November 9, 1920. Application for reissue filed August 20, 1923. Serial No. 658,399½.

*To all whom it may concern:*

Be it known that I, FREDERICK C. WHIPPEY, a citizen of the United States, residing at city of Chicago, county of Cook, and State of Illinois, have invented a certain new and useful Improvement in Locking Bolts and Nuts, of which the following is a full, clear, and exact description, such as will enable others skilled in the art to which it appertains to make and use the same, reference being had to the accompanying drawings forming part of this specification, in which—

This invention relates to a new and useful improvement in locking bolts and nuts, the object being to construct a device of the character described, which, when the nut is screwed home, will not be likely to become loose on account of the backward rotation of the nut. It has been proposed to prevent backward rotation of the nut by interposing between the nut and the surface against which it is designed to impinge, a wedge shaped washer; or to provide a nut with a protuberance on one side of the bolt; or to form an inclined inner face on the nut; or to tap the nut obliquely to its axial line. In all of these forms, the bolt is distorted slightly when the nut is screwed home, but this distortion or bowing of the bolt occurs opposite the contacting point between the nut and its impinging surface. Where a wedge shaped washer is used, this bowing occurs in one direction only, but where the protuberance is located on one side of the bolt or where the tapped opening of the nut is disposed obliquely to the axial line of the bolt, or where the inner face of the bolt is inclined, it is obvious that the bowing of the bolt is constantly changing as the nut is turned when in contact with its impinging surfaces.

Figure 1:
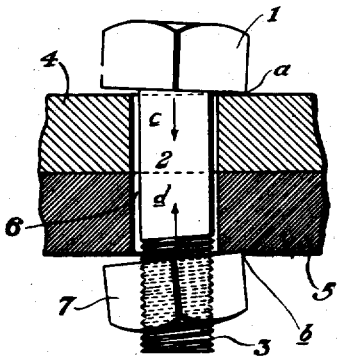
Figure 1 is a side elevation view of my improved locking bolt and nut.
Figure 4:
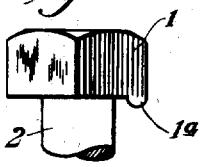
Figure 4 is a detail view of a modified form of the bolt head.

My invention contemplates a compound bowing of the bolt produced by providing the bolt with a locking head having at the beginning of the turning-down operation of its nut, a single point contact with the impinging face. This single point contact may be produced by cocking, tilting or canting the head of the bolt, as shown in Figure 1, wherein the inner and outer faces of the head are parallel or this single point contact may be produced by forming a protuberance on the inner face of the bolt head as shown in Figure 4; or the bolt head might obviously be formed with an inclined inner face. The nut may be formed by tapping the threaded opening therein along a line obliquely disposed to the axial line of the nut as shown in Figure 1, or the inner face of the nut may be inclined as shown in Figure 5, or the nut may have a protuberance located to one side of its tap opening on its inner face, which is an obvious modification.

Figure 2:
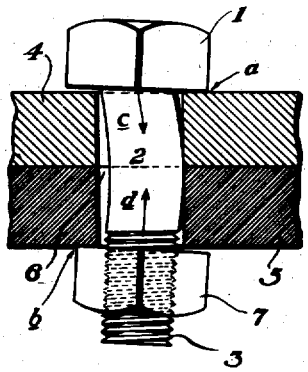
Figure 2 is a similar view showing the initial strains placed on the bolt.
Figure 3:
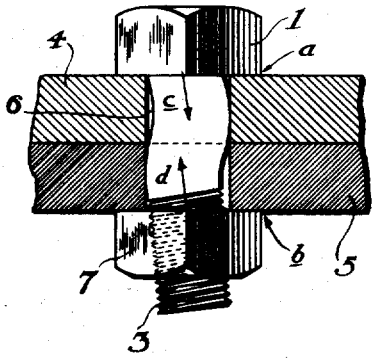
Figure 3 is a similar view showing the distorting strains placed on the bolt.

In the drawings, in Figures 1 to 3, I have shown an ordinary bolt having the usual head 1 and the shank or body portion 2 which is threaded at its lower end as at 3 4 and 5 are the two pieces which are supposed to be clamped together. 6 is an opening through the pieces 4 and 5 preferably slightly larger than the size of the bolt shank 2. 7 is the nut which, as shown in Figure 1, is about to make its first contact with the impinging face of the piece 5, while the bolt head 1 is resting at one point *a* upon the impinging face 4. The point of contact between the nut 7 and the piece 5 is indicated at *b*. The shank 2 of the bolt is normal and under no strain at the beginning of the operation of turning the nut down to its home position. The arrows *c* and *d* are to be presumed to represent normality. After making contact at *b*, further rotation of the nut will place said point of contact at the end of one-half revolution at a point diagonally opposite the point of contact *a*. The axial lines indicated by the arrows *c* and *d* are now disturbed and shank 2 of the bolt has a tendency to bow to one side, as shown in Figure 2. A further revolution of the nut 7 to bring its contacting point *b* again under the point *a* will distort the shank 2 and tend to place a compound bow in the shank. This is produced by virtue of the tendency of the head 1 to rock on its contact point *a* and to become fully seated upon the piece 4. The same is true of the nut 7. The arrows *c* and *d* indicating the axial lines and the bowing of the shank 2 is of course exaggerated in the drawings.

Attention should be directed to a peculiar feature of my improvement when the nut 7 is being screwed home or from the position of the parts shown in Figure 1 to the position of the parts shown in Figure 2 and that is that when the point *b* is under the point *a*, greater friction is encountered than when the point *b* is diagonally opposite the point *a*. I consider this feature an advantage in that it is easier to turn the nut solidly home and it will more firmly be locked in position and effect a less tendency to unscrew or become loosened when turning backwardly and encounter increased friction as the relation between the points *a* and *b* is changed.

Figure 5:
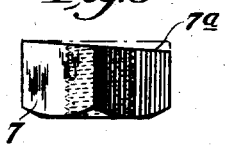
Figure 5 is a modified form of a nut.

In Figure 4, I have shown a head 1 as provided with a protuberance $1^a$, and in Figure 5, I have shown a nut 7 provided with an inclined inner face $7^a$, and when a nut, as indicated in Figure 5, is used with a construction such as shown in Figure 1, or Figure 4, it will operate in the same way as the locking bolt and nut herein above described.

It will be noted from an examination of Figure 3, that the bolt shank 2 is made to bear against the walls of the bolt hole. This contact invariably occurs unless the bolt hole is of enlarged diameter to avoid such contact. The frictional engagement illustrated in Figure 3 provides an ancillary form of locking engagement with the object upon which the bolt 1 and nut 7 are used.

Longitudinal strains upon the bolt 1 do not cause rupture of the bolt material. In locked position, the shank 2 of the bolt 1 is of slightly greater length than a straight bolt passing the plates 4 and 5. When a bolt is in a bowed position, separating stress upon the plates 4 and 5 would tend to straighten the shank 2 of the bolt by elongation rather than rupture. Such strain or stress is wholly compensated by the elasticity of the bowed shank 2 and a spring-like effect is produced. This spring-like effect further reduces the tendency to strip the threads 3 upon bolt 1 when abnormal longitudinal stress is applied to the bolt head and to the nut 7.

I claim:

1. A device of the character described comprising a bolt whose head is designed to have a projecting contact point on its impinging face and a nut on said bolt also having a projecting contact point on its impinging face.

2. A bolt head and nut whose gripping faces are angularly disposed to the bolt axis, whereby when the nut is turned home a compound bowing strain is produced in the shank of the bolt.

3. In combination, a bolt, the gripping face of which is disposed diagonally of the axis of the bolt shank and a nut which is tapped diagonally of its gripping face.

4. A bolt comprising a shank and a head, and a nut therefor, said bolt head and nut having flat adjacent contacting faces obliquely disposed to one another, one of said contacting faces being disposed diagonally to the axis of said bolt, the screwing home of the nut upon an object having parallel sides causing said contacting faces to become substantially parallel and causing said shank to be bent in a plurality of angles.

5. A bolt having a head, and a nut therefor, said bolt head and nut having contacting faces at an angle oblique to their axes when assembled, said faces becoming substantially parallel when in impinging contact with an intermediate object.

6. In combination, a bolt having a head and shank, and a nut, the impinging flat faces of said bolt head and nut being angularly disposed with respect to one another, the screwing home of the nut upon an intermediate object having parallel sides causing said shank of the bolt to be bent in a plurality of angles.

FREDERICK C. WHIPPEY.